US012715442B2

(12) United States Patent
Fowe et al.

(10) Patent No.: US 12,715,442 B2
(45) Date of Patent: Aug. 25, 2026

(54) METHOD, APPARATUS, AND COMPUTER PROGRAM PRODUCT FOR AUTOMATED LANE MERGING ASSISTANCE

(71) Applicant: HERE Global B.V., Eindhoven (NL)

(72) Inventors: James Fowe, Chicago, IL (US); Bruce Bernhardt, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 16/692,793

(22) Filed: Nov. 22, 2019

(65) Prior Publication Data

US 2021/0155244 A1 May 27, 2021

(51) Int. Cl.
*B60W 30/18* (2012.01)

(52) U.S. Cl.
CPC ... *B60W 30/18163* (2013.01); *B60W 2520/10* (2013.01); *B60W 2554/80* (2020.02); *B60W 2720/12* (2013.01); *B60W 2720/125* (2013.01)

(58) Field of Classification Search
CPC ....... B60W 30/18163; B60W 2554/80; B60W 2520/10; B60W 2720/12; B60W 2720/125; B60W 2556/65; B60W 30/12; B60W 30/0956; G08G 1/167; G08G 1/163; H04W 4/46
See application file for complete search history.

(56) References Cited

U.S. PATENT DOCUMENTS 5,521,579 A * 5/1996 Bernhard ............... G08G 1/167 340/438
7,421,334 B2 * 9/2008 Dahlgren ............... G07C 5/008 340/989
7,711,485 B2 5/2010 Matsumoto
8,612,136 B2 * 12/2013 Levine ................. G08G 1/0104 340/988
8,700,305 B2 4/2014 Hayakawa et al.
9,910,440 B2 3/2018 Wei et al.
(Continued)

FOREIGN PATENT DOCUMENTS

CN 108909710 A * 11/2018 ................ B60T 7/12
CN 110435647 A * 11/2019 .......... B60W 40/107
(Continued)

OTHER PUBLICATIONS

Merriam-Webster Dictionary, s.v. "epoch," accessed Jan. 19, 2024 https://www.merriam-webster.com/dictionary/epoch (Year: 2024).*
(Continued)

*Primary Examiner* — Daniel M. Robert
(74) *Attorney, Agent, or Firm* — Alston & Bird LLP

(57) ABSTRACT

A method, apparatus, and computer program product are provided for providing merging assistance for a vehicle. The method includes capturing a vehicle speed of the vehicle travelling in a lane of roadway. The method also includes receiving adjacent vehicle data relating to an adjacent vehicle in an adjacent lane. The method further includes receiving adjacent lane data relating to a speed of one or more vehicles in the adjacent lane. The method still further includes generating merger information for the vehicle based on the vehicle speed, the adjacent vehicle data, and the adjacent lane data. A corresponding apparatus and computer program product are also provided.

20 Claims, 4 Drawing Sheets

(56) References Cited

U.S. PATENT DOCUMENTS

2010/0023265 A1* 1/2010 Huang .................. B60W 40/06 702/1
2011/0106416 A1* 5/2011 Scofield ............... G08G 1/0104 701/119
2013/0099911 A1* 4/2013 Mudalige ............... G08G 1/166 701/23
2013/0325306 A1* 12/2013 Caveney ................ G08G 1/166 701/117
2014/0188376 A1 7/2014 Gordon
2015/0149017 A1* 5/2015 Attard ............. B60W 30/18163 701/23
2015/0345964 A1* 12/2015 Oooka ................ B60W 30/143 701/41
2017/0124882 A1 5/2017 Wang
2017/0158225 A1* 6/2017 Brown ................. G05D 1/0255
2017/0284814 A1* 10/2017 Gaither .............. G01C 21/3658
2017/0369067 A1* 12/2017 Saigusa ........... B60W 30/18163
2018/0043888 A1 2/2018 Wolf
2018/0079420 A1* 3/2018 Aine ..................... B60W 30/16
2018/0118215 A1* 5/2018 Kim ................ B60W 60/00276
2018/0201272 A1* 7/2018 Takeda .................. B60W 30/10
2018/0251155 A1 9/2018 Chan
2018/0286242 A1* 10/2018 Talamonti ............. B60W 30/14
2018/0339708 A1* 11/2018 Geller ............... B60W 50/0097
2018/0374113 A1* 12/2018 Ramirez ............ G06Q 10/0635
2019/0077399 A1 3/2019 Ito et al.
2019/0164424 A1* 5/2019 Kleen ..................... H04W 4/46
2019/0329769 A1* 10/2019 Shalev-Shwartz ... G05D 1/0223
2019/0382015 A1* 12/2019 Niu ....................... F16H 61/061
2021/0031800 A1* 2/2021 Fuchs ............... B60W 60/0027
2021/0150899 A1* 5/2021 Su ..................... B60W 60/0027

FOREIGN PATENT DOCUMENTS

DE 102012001405 A1 * 11/2012 ...... B60W 30/18163
JP 6237053 B2 * 11/2017
JP 2018184112 A * 11/2018
KR 20120056158 A * 6/2012 ............ B60W 10/20
KR 101399026 B1 5/2014
KR 20160131322 A 11/2016
WO WO 2018/006909 A1 1/2018

OTHER PUBLICATIONS

Safe Following Distances | Transport and motoring | Queensland Government [online] [retrieved Feb. 3, 2020]. Retrieved via the Internet: https://www.gld.gov.au/transport/safety/rules/road/distances (dated Apr. 13, 2015) 3 pages.

Extended European Search Report for European Application No. 20209274.8 dated Apr. 14, 2021, 9 pages.

Office Action for European Application No. 20209274.8 dated Apr. 24, 2023, 7 pages.

* cited by examiner

METHOD, APPARATUS, AND COMPUTER PROGRAM PRODUCT FOR AUTOMATED LANE MERGING ASSISTANCE

TECHNOLOGICAL FIELD

An example embodiment relates generally to a method and associated apparatus and computer program product for providing multi-lane traffic guidance and, more particularly, to a method and associated apparatus and computer program product for providing merging assistance to vehicles during operation.

BACKGROUND

Traditionally, in order to merge from one lane to another, a driver must check for oncoming vehicles in the other lane and determine whether there is sufficient room for merging. This method is difficult, even for humans, in an instance there is a vast difference in vehicle speed between lanes. These merging actions are even more difficult for autonomous vehicles that do not allow as many fault options for cases of merging not being successful (e.g., travelling onto the shoulder of the roadway to avoid a collision). For example, vehicle sensors installed on vehicles are often only image sensors and can only determine the distance of an oncoming vehicle, not the speed of said vehicle.

One current method of dealing with merging issues uses vehicle to vehicle (V2V) or other vehicle to everything (V2X) configurations that allow a vehicle to communicate with an oncoming vehicle to allow for one or both vehicles to adjust to allow for a safe merging sequence. However, this type of communication is limited to vehicles that have V2V or V2X capabilities and places a reliance on the adjacent vehicle as a part of the safe merging sequence.

BRIEF SUMMARY

A method, apparatus, and computer program product are provided in accordance with an example embodiment in order to provide merging assistance for a vehicle. In an example embodiment, a method for providing merging assistance for a vehicle is provided. The method includes capturing a vehicle speed of the vehicle travelling in a lane of roadway. The method also includes receiving adjacent vehicle data relating to an adjacent vehicle in an adjacent lane. The method further includes receiving adjacent lane data relating to a speed of one or more vehicles in the adjacent lane. The method still further includes generating merger information for the vehicle based on the vehicle speed, the adjacent vehicle data, and the adjacent lane data.

In some embodiments, the method also includes providing a signal relating to the merger information for the vehicle. In some embodiments, the merger information includes at least one of a target merge speed or a merging acceleration based on the adjacent vehicle data, the adjacent lane data, and the vehicle speed. In some embodiments, the method also includes providing, via a user interface, at least a portion of the merger information.

In some embodiments, the method also includes updating a driving lane of the vehicle based on the merging information. In some embodiments, the method also includes altering the acceleration of the vehicle based on the merger information. In some embodiments, the adjacent vehicle data includes sensor data from a sensor positioned on the vehicle.

In another example embodiment, an apparatus for providing merging assistance for a vehicle is provided. The apparatus comprising at least one processor and at least one non-transitory memory including computer program code instructions, the computer program code instructions configured to, when executed, cause the apparatus to capture a vehicle speed of the vehicle travelling in a lane of roadway. The computer program code instructions are also configured to, when executed, cause the apparatus to receive adjacent vehicle data relating to an adjacent vehicle in an adjacent lane. The computer program code instructions are further configured to, when executed, cause the apparatus to receive adjacent lane data relating to a speed of one or more vehicles in the adjacent lane. The computer program code instructions are still further configured to, when executed, cause the apparatus to generate merger information for the vehicle based on the vehicle speed, the adjacent vehicle data, and the adjacent lane data.

In some embodiments, the computer program code instructions are also configured to, when executed, cause the apparatus to provide a signal relating to the merger information for the vehicle. In some embodiments, the merger information includes at least one of a target merge speed or a merging acceleration based on the adjacent vehicle data, the adjacent lane data, and the vehicle speed. In some embodiments, the computer program code instructions are also configured to, when executed, cause the apparatus to provide at least a portion of the merger information.

In some embodiments, the computer program code instructions are also configured to, when executed, cause the apparatus to update a driving lane of the vehicle based on the merging information. In some embodiments, the computer program code instructions are also configured to, when executed, cause the apparatus to alter the acceleration of the vehicle based on the merger information. In some embodiments, the adjacent vehicle data comprises sensor data from a sensor positioned on the vehicle.

In still another example embodiment, a computer program product is provided. The computer program product includes at least one non-transitory computer-readable storage medium having computer-executable program code portions stored therein, the computer-executable program code portions comprising program code instructions configured to capture a vehicle speed of the vehicle travelling in a lane of roadway. The computer-executable program code portions also include program code instructions configured to receive adjacent vehicle data relating to an adjacent vehicle in an adjacent lane. The computer-executable program code portions further include program code instructions configured to receive adjacent lane data relating to a speed of one or more vehicles in the adjacent lane. The computer-executable program code portions still further include program code instructions configured to generate merger information for the vehicle based on the vehicle speed, the adjacent vehicle data, and the adjacent lane data.

In some embodiments, the merger information includes at least one of a target merge speed or a merging acceleration based on the adjacent vehicle data, the adjacent lane data, and the vehicle speed. In some embodiments, the program code instructions are further configured to provide at least a portion of the merger information. In some embodiments, the program code instructions are further configured to update a driving lane of the vehicle based on the merging information. In some embodiments, the program code instructions are further configured to alter the acceleration of the vehicle based on the merger information. In some embodiments, the adjacent vehicle data comprises sensor data from a sensor positioned on the vehicle.

In still another example embodiment, an apparatus for providing merging assistance for a vehicle is provided. The apparatus includes means for capturing a vehicle speed of the vehicle travelling in a lane of roadway. The apparatus also includes means for receiving adjacent vehicle data relating to an adjacent vehicle in an adjacent lane. The apparatus further includes means for receiving adjacent lane data relating to a speed of one or more vehicles in the adjacent lane. The apparatus still further includes means for generating merger information for the vehicle based on the vehicle speed, the adjacent vehicle data, and the adjacent lane data.

In some embodiments, the apparatus also includes means for providing a signal relating to the merger information for the vehicle. In some embodiments, the merger information includes at least one of a target merge speed or a merging acceleration based on the adjacent vehicle data, the adjacent lane data, and the vehicle speed. In some embodiments, the apparatus also includes providing, via a user interface, at least a portion of the merger information.

In some embodiments, the apparatus also includes means for updating a driving lane of the vehicle based on the merging information. In some embodiments, the apparatus also includes means for altering the acceleration of the vehicle based on the merger information. In some embodiments, the adjacent vehicle data includes sensor data from a sensor positioned on the vehicle.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Figure 1:
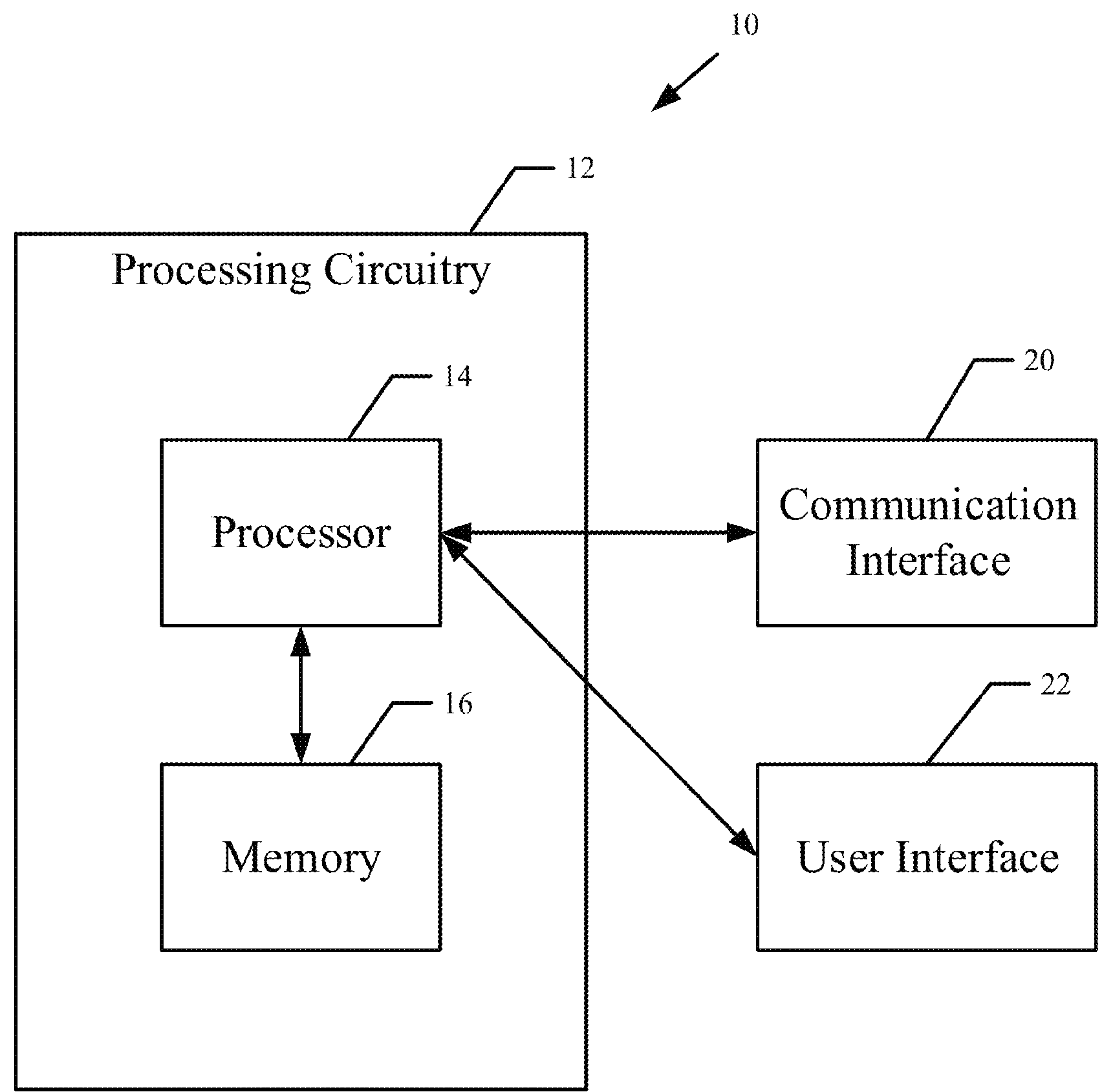
Figure 2:
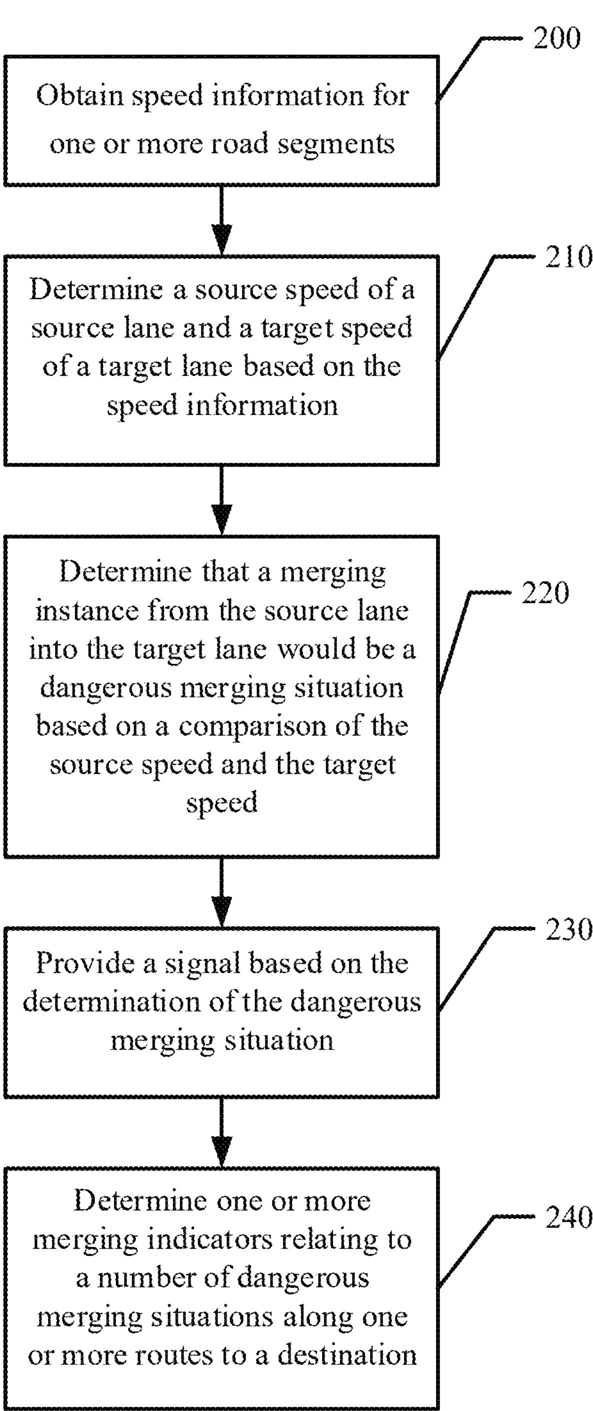
Figure 3:
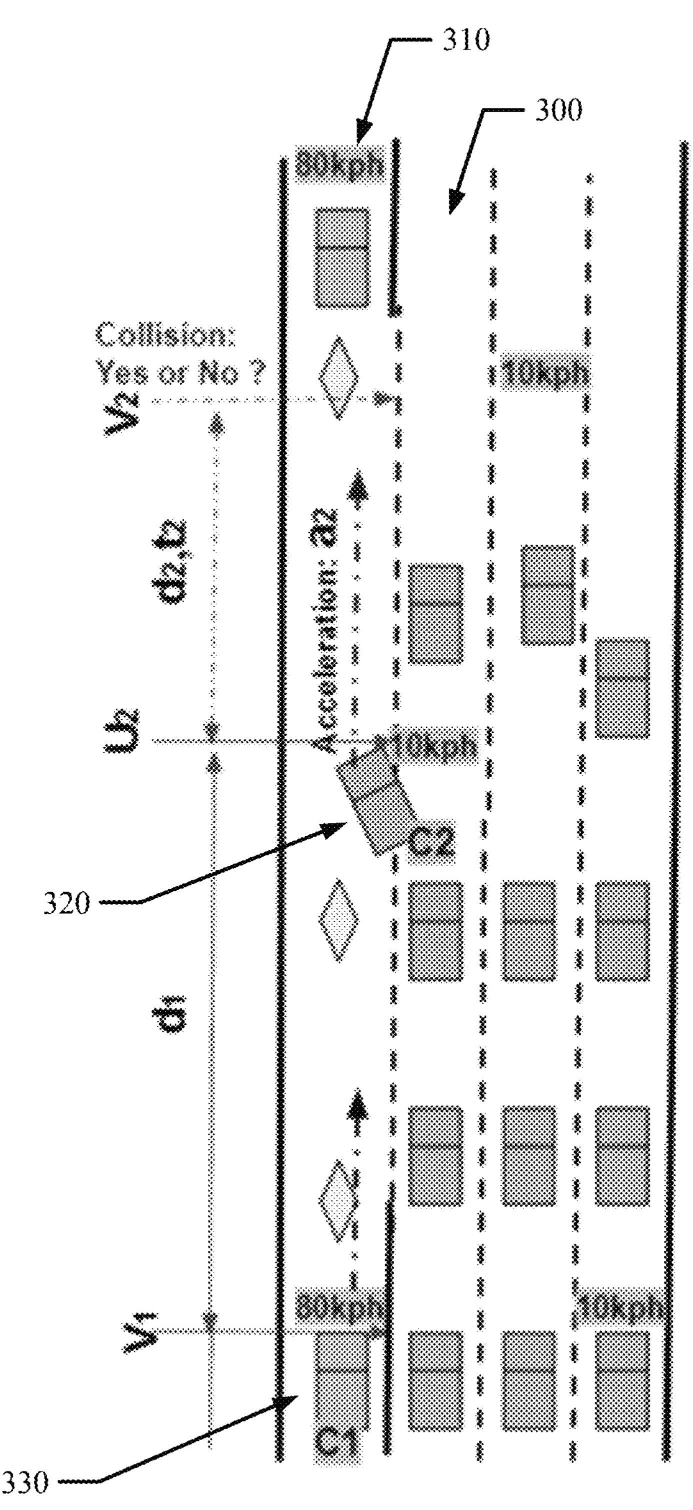
Figures 4A, 4B:
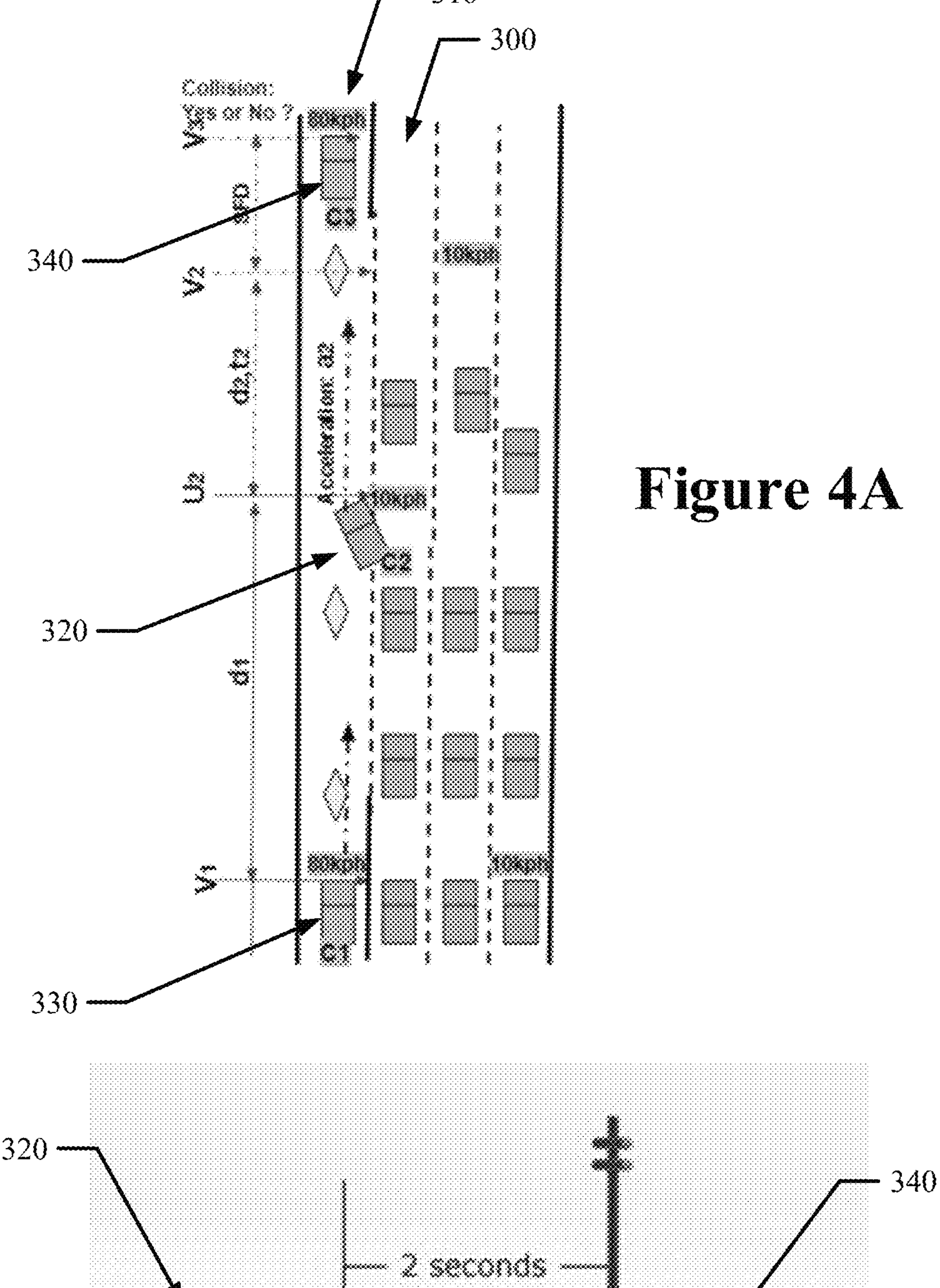

Having thus described certain example embodiments of the present disclosure in general terms, reference will hereinafter be made to the accompanying drawings, which are not necessarily drawn to scale, and wherein:

FIG. 1 is a block diagram of an apparatus configured in accordance with an example embodiment of the present disclosure;

FIG. 2 is a flowchart illustrating the operations performed, such as by the apparatus of FIG. 1, in accordance with an example embodiment of the present disclosure;

FIG. 3 is a map illustrating an example merging situation in accordance with an example embodiment of the present disclosure; and FIGS. 4A and 4B illustrate an instance in which a merging vehicle maintains a safe following distance behind a downstream vehicle in accordance with an example embodiment of the present disclosure.

DETAILED DESCRIPTION

Some embodiments will now be described more fully hereinafter with reference to the accompanying drawings, in which some, but not all, embodiments are shown. Indeed, various embodiments may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

A method, apparatus, and computer program product are provided in accordance with an example embodiment of the present disclosure for providing merging assistance for a vehicle. In an example embodiment, the method, apparatus, and computer program are provided for facilitating autonomous and semi-autonomous driving in a multi-lane environment (e.g., an interstate). Merging between lanes with vehicles travelling at vastly different speeds (e.g., a slow lane and a faster moving high-occupancy vehicle (HOV) lane) can be difficult for both autonomous and non-autonomous vehicles. As described below, the method, apparatus, and computer program product of an example embodiment leverages advances in driver assistance features, along with known lane-level traffic information, to facilitate merging between different lanes, such as an HOV lane. Although described in conjunction with autonomous and semi-autonomous vehicles, the method, apparatus, and computer program product of an example embodiment may also be utilized in conjunction with manually-driven vehicles.

FIG. 1 is a schematic diagram of an example apparatus configured for performing any of the operations in accordance with an example embodiment as described herein. Apparatus 10 may be embodied by or associated with any of a variety of computing devices that include or are otherwise associated with a device configured for providing an advanced driver assistance features. For example, the computing device may be an Advanced Driver Assistance System module (ADAS) which may at least partially control autonomous or semi-autonomous features of a vehicle; however embodiments of the apparatus may be embodied or partially embodied as a mobile terminal, such as a personal digital assistant (PDA), mobile telephone, smart phone, personal navigation device, smart watch, tablet computer, camera or any combination of the aforementioned and other types of voice and text communications systems. In various embodiments, the apparatus may be carried onboard the vehicle or be remote from the vehicle (e.g., offboard of vehicle). In one embodiment, the apparatus 10 is embodied or partially embodied by an electronic control unit of a vehicle that supports safety-critical systems such as the powertrain (engine, transmission, electric drive motors, etc.), steering (e.g., steering assist or steer-by-wire), and braking (e.g., brake assist or brake-by-wire). Alternatively, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 10 may include, be associated with, or may otherwise be in communication with a processing circuitry 12, which includes a processor 14 and a memory device 16, a communication interface 20, a user interface 22, and one or more sensors 24. In some embodiments, the processor 14

(and/or co-processors or any other processing circuitry assisting or otherwise associated with the processor) may be in communication with the memory device 16 via a bus for passing information among components of the apparatus. The memory device 16 may be non-transitory and may include, for example, one or more volatile and/or non-volatile memories. In other words, for example, the memory device 16 may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

The processor 14 may be embodied in a number of different ways. For example, the processor 14 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 14 may be configured to execute instructions stored in the memory device 16 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

The apparatus 10 of an example embodiment may also include or otherwise be in communication with a user interface 22. The user interface may include a touch screen display, a speaker, physical buttons, and/or other input/output mechanisms. In an example embodiment, the processor 14 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 16, and/or the like). The user interface may be embodied in the same housing as the processing circuitry, such as in a navigation system.

The apparatus 10 of an example embodiment may also optionally include a communication interface 20 that may be any means such as a device or circuitry embodied in either hardware or a combination of hardware and software that is configured to receive and/or transmit data from/to other electronic devices in communication with the apparatus, such as by near field communication (NFC) or other proximity-based techniques. Additionally or alternatively, the communication interface may be configured to communicate via cellular or other wireless protocols including Global System for Mobile Communications (GSM), such as but not limited to Long Term Evolution (LTE). In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication for vehicle to vehicle or vehicle to infrastructure wireless links. In example embodiments, the communication interface 20 may receive and transmit lane data for one or more lanes from a traffic service provider (TSP). For example, communication interface 20 may receive lane data for an HOV lane near the vehicle (e.g., an adjacent lane).

The apparatus 10 may be equipped, or otherwise in communication with one or more sensors 24, such as a global positioning system (GPS), accelerometer, image sensor/camera, LiDAR (Light Distancing and Ranging) sensor, radar, and/or gyroscope. Any of the sensors may be used to sense information regarding the movement, positioning, or conditions of the vehicle and/or surroundings. For example, a sensor, or set of sensors, may be used to distance between vehicles on a road. In some example embodiments, such sensors may be implemented in a vehicle or other remote apparatus, and the information detected may be transmitted to the apparatus 10, such as by near field communication (NFC) including, but not limited to, Bluetooth™ communication, or the like. In some embodiments, the one or more sensors 24 may be connected, at least in part, by a wired connection. In various embodiments, the sensor(s) 24 may be carried by a vehicle. In an example embodiment, at least one of the sensor(s) 24 may be a vision sensor and/or a blind spot detection sensor. In some embodiments, the apparatus 10 may include means, such as the processing circuitry 12, the processor 14, the communication interface 20, or the like, for receiving adjacent vehicle data for one or more adjacent vehicles from at least one sensor 24.

Autonomous driving has become a focus of recent technology with recent advances in machine learning, computer vision, and computing power able to conduct real-time sensing of a vehicle's condition and environment. With that, the interaction between vehicles on the road, both autonomous and otherwise, is of interest. Without communication with every surrounding vehicle, autonomous vehicle operation may be difficult on multilane roadways, especially during heavy traffic periods. In this regard, a determination of where other vehicles are located and the proper merging technique to be taken are informative for planning a merging action, especially merging into faster moving lanes (e.g., an HOV lane).

Referring now to FIG. 2, the operations performed by the apparatus 10 of an example embodiment of the present disclosure includes means, such as the processing circuitry 12, the processor 14 or the like, for providing merging assistance for a vehicle. In an example embodiment, detailed herein, the method, apparatus, and computer program product could be used in relation to vehicles including both autonomous vehicles and manually-operated vehicles.

As shown in block 200 of FIG. 2, the apparatus 10 includes means, such as the processing circuitry 12, the processor 14 or the like, for capturing a vehicle speed of the vehicle travelling in a lane of roadway. In various embodiments, the vehicle speed may be monitored by the instruments onboard the vehicle (e.g., a speedometer) or remotely (e.g., derived from GPS information). In some embodiments, the on-board instruments may be existing instruments installed on the vehicle (e.g., a speedometer used to display the speed to a driver). In some embodiments, the speedometer may be carried by, but not integral to, the vehicle (e.g., such as a mobile device in the vehicle). In some embodiments, the vehicle speed may be derived using Global Navigation Satellite System (GNSS) and/or GPS information. In some embodiments, other methods of tracking a vehicle speed, such as radar, may be used.

Referring now to Block 210 of FIG. 2, the apparatus 10 includes means, such as the processing circuitry 12, the processor 14 or the like, for receiving adjacent vehicle data relating to an adjacent vehicle in an adjacent lane. In various embodiments, an adjacent vehicle may be a vehicle in the adjacent lane is in proximity of the vehicle and does not necessarily mean directly beside the vehicle. In various embodiments, the adjacent lane referenced herein may be an HOV lane or other specialty lane in which the speed of the adjacent lane may be greater than the current lane of a vehicle. In some embodiments, the adjacent vehicle data may be captured by one or more sensors 24 positioned on the vehicle potentially merging. In some embodiments, the sensor(s) 24 may be a vision sensor, a blind-spot monitor, or the like. In some embodiments, the adjacent vehicle data may be an image. In some embodiments, the adjacent vehicle data may include the current location of the adjacent vehicle (e.g., distance from the sensor). In some embodiments, the apparatus 10 includes means, such as the processing circuitry 12, the communication interface 20, or the like, for receiving adjacent vehicle data for a plurality of adjacent vehicles. For example, in an instance a vehicle is travelling next to an HOV lane, the apparatus 10 may receive adjacent vehicle data, such as from the sensor(s) 24, for an adjacent vehicle upstream from the vehicle in the adjacent lane and for an adjacent vehicle downstream from the vehicle in the adjacent lane. In some embodiment, the apparatus 10 may request adjacent vehicle data from the sensor(s) 24. In some embodiments, the apparatus 10 may receive adjacent vehicle data from the sensor(s) 24 in an instance the adjacent vehicle satisfies a certain threshold. For example, the apparatus 10 may receive adjacent vehicle data each time an adjacent vehicle is within a predetermined distance of the sensor. In various embodiments, the vehicle data may be received using V2X, satellite, radar, infrastructure video feeds, and/or the like. For example, the apparatus 10 may receive the current speed of an adjacent vehicle via V2X technology.

Referring now to Block 220 of FIG. 2, the apparatus 10 includes means, such as the processing circuitry 12, the processor 14 or the like, for receiving adjacent lane data relating to the speed of one or more vehicles in the adjacent lane. In some embodiments, the adjacent lane may be a specialty lane, such as an HOV lane or a toll lane, where the vehicle density may commonly be different than the current lane. For example, in some embodiments, during rush hour, the HOV lane may move faster than the non-HOV lanes. In some embodiments, the apparatus 10 includes means, such as the processing circuitry 12, the communication interface 20, or the like, for receiving the adjacent lane data at regular intervals. For example, the adjacent lane data may be received by the apparatus 10 every one minute. In some embodiment, the apparatus 10 may be in communication with a traffic service provider (TSP). In such an embodiment, the apparatus 10 may receive the adjacent lane data from the TSP. In some embodiments, the adjacent lane data may include at least one of the vehicle speed within the adjacent lane, the vehicle density within the adjacent lane, or the like. In various embodiments, the vehicle speed may be determined based on the speed of one or more vehicles, currently or recently, in the adjacent lane. In some embodiments, the speed of the adjacent lane may be based on the speed of the vehicle(s) providing information to the TSP. For example, the TSP may have an internal process in which the TSP may use technologies, such as Lane Level Map-matcher, with probes placed in different lanes of the road to estimate the speed of a vehicle in the lane. In some embodiments, the adjacent lane data (e.g., speed) may be based on real-time data (e.g., the speed of vehicles currently in the lane). Additionally or alternatively, the adjacent lane data (e.g., speed) may be based on historical data for the same epoch. For example, historical speed information may be used to determine an initial estimate of likelihood of safe merging (e.g., a roadway may be typically congested for a few kilometers and the historical data may indicate whether to merge now or wait). In various embodiments, the adjacent lane data may be received from V2X, satellite, radar, and/or infrastructure video feeds sources.

Referring now to Block 230 of FIG. 2, the apparatus 10 includes means, such as the processing circuitry 12, the processor 14 or the like, for generating merger information for the vehicle based on the vehicle speed, the adjacent vehicle data, and the adjacent lane data. In some embodiments, the merger information may include a target merge speed, a target acceleration over a period of time to merge safely, a safety rating of a potential merge, and/or the like. In some embodiment, the target acceleration may be the acceleration needed to achieve the target merge speed in a set amount of time. In some embodiments, the target merge speed may be the speed of the vehicle in the adjacent lane. In some embodiments, the acceleration may be based on the initial vehicle speed, the adjacent lane speed from multiple vehicles, the distance of the adjacent vehicle to the vehicle, and/or the like. The merger information generated is discussed in greater detail below in reference to an example shown in FIG. 3.

Referring now to Block 240 of FIG. 2, the apparatus 10 includes means, such as the processing circuitry 12, the processor 14 or the like, for providing a signal relating to the merger information for the vehicle. The signal provided may be any response by the apparatus, such as the processing circuitry 12, the processor 14 or the like, to the generation of merger information. For autonomous vehicles, this signal may be configured to cause a vehicle to merge into the adjacent lane without driver interaction. In some embodiments, the user may be able to determine whether an autonomous vehicle will automatically merge or ask for the approval of an alteration from the user. For autonomous vehicles that retain human driver features, the apparatus, such as the processor 12, of an example embodiment may allow for a driver to override the merging action. In some embodiments, autonomous vehicles with a driver override may notify the driver of the impending alteration in route and permit driver override, if desired.

In some embodiments, for semi-autonomous or non-autonomous, manually-operated vehicles, the signal may be configured to cause a message to be communicated to the driver of the vehicle. The message may be provided in various forms and may notify the driver of the merger information. In various embodiments, the message may be audible and/or visual. In some embodiments, the message may be communicated through pre-existing interfaces, such as a navigation system, infotainment system, or a speaker system. Additionally or alternatively, the message may be communicated through a dedicated interface element, such as a light on the dashboard. In various embodiments, the information provided in the message may include recommended merging speed, the time to merge, the distance to the adjacent vehicle, the adjacent lane speed, the target acceleration, and/or the like. Notwithstanding the foregoing examples, there are many ways to communicate the signal to the driver.

In some embodiments, the apparatus 10 may include means, such as the processing circuitry 12, the processor 14, or the like, for updating a driving lane of the vehicle based on the merging information. For example, in an autonomous vehicle, the apparatus 10 may upon determining the merging information of Block 240 may determine whether the merging may be possible (e.g., based on a predefined setting for a vehicle capabilities and/or user preference) based on the merging information (e.g., merging acceleration, target merge speed, or the like). In various embodiments, such as for non-autonomous vehicles, an indication to update the driving lane may be communicated to the driver, such as discussed above in reference to the message to the driver. In some embodiments, the apparatus 10 may include means, such as the processing circuitry 12, the processor 14, or the like, for altering the acceleration of the vehicle based on the merger information. For example, in an instance the apparatus 10 updates the driving lane, the apparatus 10 may also increase the acceleration in order to safely merge into the faster lane. In some embodiments, the acceleration of the vehicle may be at least the minimum acceleration ($a_{min}$) discussed below.

Referring now to FIG. 3, an example merging situation is provided that may use an example embodiment of the present disclosure to assist. For the example shown, the vehicle 320 may be travelling along a lane 300 of a roadway. As shown, the adjacent HOV lane 310 has less vehicles and is therefore going faster (e.g., 80 kilometers per hour instead of 10 kilometers per hour for lane 300). In some embodiments, the vehicle 320 may be equipped with, or in communication with, an apparatus 10 discussed herein. The vehicle 320 may be equipped with one or more sensors 24 (not shown) to determine the distance ($d_1$) from the vehicle to an oncoming adjacent vehicle 330 in the adjacent HOV lane 310. The apparatus 10 may receive adjacent lane data for the adjacent HOV lane 310 (e.g., speed of the adjacent lane). As such, the apparatus 10 may determine the target merging acceleration for the vehicle 320.

In some embodiments, the target merging acceleration for the vehicle 320 may be based on the vehicle speed of the vehicle 320, the distance ($d_1$) between the vehicle 320 and the adjacent vehicle 330 as defined in the direction of the road, and information regarding the speed of the adjacent vehicle 330, such as the speed of the adjacent lane 310. In some embodiments, the target merging speed may be equal to or above the speed of the adjacent lane 310, such that the target merging acceleration is the amount of acceleration needed by the vehicle 320 in order to reach the speed of the adjacent lane 310 before the adjacent vehicle 330 reaches the vehicle 320 (e.g., assuming the adjacent vehicle is travelling at the speed of the adjacent lane 310 and does not alter speed). In some embodiments, the adjacent vehicle 330 "reaching" the vehicle 320 may be defined as physical contact with the vehicle 320 or within a predetermined distance of the vehicle 320.

In some embodiments, a margin of safety may be implemented to account for any differences between the speed of the adjacent lane 310 and the actual speed of the adjacent vehicle 330. For example, in an instance the adjacent vehicle is going faster than the speed of the adjacent lane 310, without a margin of safety, a collision may occur even if the vehicle 320 follows the recommended merging acceleration. In other embodiments, the target merging speed may be equal to or above the speed of the adjacent vehicle 330, such that the target merging acceleration is the amount of acceleration needed by the vehicle 320 in order to reach the speed of the adjacent vehicle 330 before the adjacent vehicle 330 reaches the vehicle 320

In some embodiment, a safe merging outcome may be achieved in an instance the time ($t_2$) it takes the vehicle to reach speed of the adjacent lane ($V_1$) is less than or equal to the time ($t_1$) for the adjacent vehicle to reach the vehicle (e.g., the distance between the vehicle and the adjacent vehicle originally ($d_1$) plus the distance ($d_2$) for the vehicle to reach the speed of the adjacent vehicle). The safe merging may be determined using the following equation:

$$t_2 < \frac{d_1 + d_2}{V_1}$$

In some embodiments, a margin of safety may include an additional buffer such that a constant value may be added to $t_2$ to ensure that a safe merging outcome may be achieved.

In some embodiments, the period of time for the vehicle to accelerate (at the target merging acceleration) may be a predetermined value. For example, the period of time may be 10 seconds. In other embodiments, the period of time may be based on the distance between the vehicle (e.g., vehicle 320) and the adjacent vehicle (e.g., vehicle 330). For example, in an instance the target merging speed is the same as the speed of the adjacent lane (e.g., such that the vehicles should not collide), then the determination of the maximum amount of time to merge may be determined using the following equation:

$$t_{max} = \frac{2d_1}{V_1 - U_2}$$

In such an equation, $d_1$ is the distance between the vehicle (e.g., vehicle 320) and the adjacent vehicle (e.g., vehicle 330), $V_1$ is the speed of the adjacent lane (adjacent lane 310), $U_2$ is the starting speed of the vehicle (e.g., vehicle 320). In such an embodiment, the vehicle (e.g., vehicle 320) may have $t_{max}$ to reach the speed of the adjacent lane before being hit by the adjacent vehicle. In various embodiments, the time to accelerate may be used to determine the safety of a potential merge (e.g., a shorter amount of time required for accelerating may indicate a safer merge). Additionally, the maximum accelerating time may be used in conjunction with the target merging acceleration to determine both the feasibility and the safety of a merging action. For example, the vehicle (e.g., vehicle 320) may not be able to accelerate at the target merging acceleration for the required amount of time (e.g., the vehicle is not powerful enough). In various embodiments, the minimum acceleration may be determined using the following equation:

$$a_{min} = \frac{(V_1 - U_2)^2}{2d_1}$$

In various embodiments, the $a_{min}$ in combination with the $t_{max}$ may be used to determine the safety rating of a potential merge. In some embodiments, the safety rating may be based on the vehicle type and/or user preferences. For example, some vehicles may be more capable to maintain high acceleration for an extended time period and some users (e.g., drivers and/or passengers) may be more willing to experience a high acceleration rate during the merging operation. In various embodiments, the apparatus 10 includes means, such as the processing circuitry 12, the processor 14, or the like, for determining a safe merging outcome based on $t_{max}$ and $a_{min}$.

Referring now to FIGS. 4A and 4B, the apparatus 10 includes means, such as the processing circuitry 12, the processor, or the like, for maintaining a safe following distance between the vehicle merging and a downstream vehicle in the adjacent lane. In an instance a vehicle (e.g., vehicle 320) is merging from a slower lane (e.g., lane 300) into a faster lane (e.g., adjacent HOV lane 310), the vehicle speed must be increased in order to avoid being hit by the trailing or oncoming adjacent vehicle (e.g., vehicle 330), but must also be selected so as to stay behind any downstream adjacent vehicles (e.g., vehicle 340) in the faster lane 310. In some embodiments, the merging vehicle may remain behind the downstream vehicle by maintaining the speed of the adjacent lane (e.g., lane 310). Additionally or alternatively, the apparatus 10 may receive information from one or more sensors 24 relating to the distance from the vehicle 320 and the downstream vehicle 340. In some embodiments, the apparatus 10 may determine the safe following distance based on a predetermined travel-time gap. In some embodiments, the predetermined travel-time gap may be based on the vehicle types (e.g., the predetermined travel-time gap may vary in direct relation to the vehicle length) and road conditions (e.g., wet roads may require a larger gap). In some embodiments, the travel-time gap may be set by a third-party (e.g., vehicle manufacturer). Alternatively, the user (e.g., driver or passenger) may be able to adjust the travel-time gap (e.g., a passenger may increase the travel-time gap to increase safety of vehicle). For example, as shown in FIG. 4B, the travel-time gap may be set to 2 seconds.

Various embodiments of the methods, apparatuses, and computer program products provided herein allow for merging assistance for a vehicle to be provided. In an example embodiment, the method, apparatus, and computer program are provided for facilitating autonomous and semi-autonomous driving in a multi-lane environment (e.g., an interstate). As described herein, the method, apparatus, and computer program product of an example embodiment leverage advances in driver assistance features, along with known lane-level traffic information, to facilitate merging between different lanes, such as an HOV lane. Although described in conjunction with autonomous and semi-autonomous vehicles, the method, apparatus, and computer program product of an example embodiment may also be utilized in conjunction with manually-driven vehicles.

As described above, FIG. 2 illustrates a flowchart of an apparatus 10, method, and computer program product according to example embodiments of the disclosure. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 16 of a software development test platform employing an embodiment of the present disclosure and executed by the processing circuitry 12, the processor 14 or the like of the software development test platform. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method of providing merging assistance for a vehicle, the method comprising:

capturing a vehicle speed of the vehicle travelling in a lane of a roadway;

receiving adjacent vehicle data relating to an adjacent vehicle in an adjacent lane;

receiving adjacent lane data including vehicle speed of one or more vehicles within the adjacent lane, wherein the vehicle speed of the adjacent lane data is based on historical speed data associated with the adjacent lane for a same time epoch from a traffic service provider and is different from the vehicle speed; and based on the vehicle speed, the adjacent vehicle data, a safe following distance, and the adjacent lane data, generating merger information for a potential merge for the vehicle, wherein the merger information comprises at least a safety rating of the potential merge, wherein the safety rating of the potential merge is based in part on a minimum acceleration of the vehicle and a maximum amount of time to reach the vehicle speed of one or more vehicles within the adjacent lane and merge, wherein the safety rating is further based at least on a vehicle type of the vehicle, wherein the potential merge comprises the vehicle entering the adjacent lane and accelerating to the vehicle speed of one or more vehicles within the adjacent lane while remaining at least the safe following distance ahead of the adjacent vehicle, and wherein the safe following distance is based on a predetermined travel-time gap that is based on (i) the vehicle type including a length of the vehicle, and (ii) a road condition, and wherein the maximum amount of time to reach the vehicle speed of one or more vehicles within the adjacent lane is determined based on a formula of twice a distance between the vehicle and the adjacent vehicle divided by the vehicle speed subtracted from the vehicle speed of one or more vehicles within the adjacent lane.

2. The method of claim 1, further comprising providing a signal relating to the merger information for the vehicle.

3. The method of claim 1, wherein the merger information comprises at least one of a target merge speed or a merging acceleration based on the adjacent vehicle data, the adjacent lane data, and the vehicle speed.

4. The method of claim 1, further comprising providing, via a user interface, at least a portion of the merger information.

5. The method of claim 1, further comprising updating a driving lane of the vehicle based on the merger information.

6. The method of claim 5, further comprising altering the minimum acceleration of the vehicle based on the merger information.

7. The method of claim 1, wherein receiving adjacent vehicle data comprises receiving adjacent vehicle data for an adjacent vehicle upstream from the vehicle in the adjacent lane and for an adjacent vehicle downstream from the vehicle in the adjacent lane.

8. The method of claim 1, wherein receiving adjacent vehicle data comprises receiving adjacent vehicle data in an instance in which an adjacent vehicle satisfies a certain threshold.

9. The method of claim 1, wherein the vehicle travelling in the lane of the roadway is travelling in traffic and the vehicle speed is slower than the vehicle speed of one or more vehicles within the adjacent lane.

10. The method of claim 1, wherein the maximum amount of time to reach the vehicle speed of one or more vehicles within the adjacent lane is determined based on a formula of twice a distance between the vehicle and the adjacent vehicle divided by the vehicle speed subtracted from the vehicle speed of one or more vehicles within the adjacent lane.

11. An apparatus for providing merging assistance for a vehicle, the apparatus comprising at least one processor and at least one non-transitory memory including computer program code instructions, the computer program code instructions configured to, when executed, cause the apparatus to:

capture a vehicle speed of the vehicle travelling in a lane of a roadway;

receive adjacent vehicle data relating to an adjacent vehicle in an adjacent lane, receive adjacent lane data including vehicle speed of one or more vehicles within the adjacent lane, wherein the vehicle speed of the adjacent lane data is based on historical speed data associated with the adjacent lane for a same time epoch from a traffic service provider and is different from the vehicle speed; and based on the vehicle speed, the adjacent vehicle data, a safe following distance, and the adjacent lane data, generate merger information for a potential merge for the vehicle, wherein the merger information comprises at least a safety rating of the potential merge, wherein the safety rating of the potential merge is based in part on a minimum acceleration of the vehicle and a maximum amount of time to reach the vehicle speed of one or more vehicles within the adjacent lane and merge, wherein the potential merge comprises the vehicle entering the adjacent lane and accelerating to the vehicle speed of one or more vehicles within the adjacent lane while remaining at least the safe following distance ahead of the adjacent vehicle, wherein the safety rating is further based at least on a vehicle type of the vehicle, and wherein the safe following distance is based on a predetermined travel-time gap that is based on (i) the vehicle type including a length of the vehicle, and (ii) a road condition, and wherein the maximum amount of time to reach the vehicle speed of one or more vehicles within the adjacent lane is determined based on a formula of twice a distance between the vehicle and the adjacent vehicle divided by the vehicle speed subtracted from the vehicle speed of one or more vehicles within the adjacent lane.

12. The apparatus of claim 11, wherein the computer program code instructions are further configured to, when executed, cause the apparatus to provide a signal relating to the merger information for the vehicle.

13. The apparatus of claim 11, wherein the merger information comprises at least one of a target merge speed or a merging acceleration based on the adjacent vehicle data, the adjacent lane data, and the vehicle speed.

14. The apparatus of claim 11, wherein the computer program code instructions are further configured to, when executed, cause the apparatus to provide at least a portion of the merger information.

15. The apparatus of claim 11, wherein the computer program code instructions are further configured to, when executed, cause the apparatus to update a driving lane of the vehicle based on the merger information.

16. The apparatus of claim 15, wherein the computer program code instructions are further configured to, when executed, cause the apparatus to alter the minimum acceleration of the vehicle based on the merger information.

17. A computer program product comprising at least one non-transitory computer-readable storage medium having computer-executable program code portions stored therein, the computer-executable program code portions comprising program code instructions configured to:

capture a vehicle speed of a vehicle travelling in a lane of a roadway;

receive adjacent vehicle data relating to an adjacent vehicle in an adjacent lane;

receive adjacent lane data including vehicle speed of one or more vehicles within the adjacent lane, wherein the vehicle speed of the adjacent lane data is based on historical speed data associated with the adjacent lane for a same time epoch from a traffic service provider and is different from the vehicle speed; and based on the vehicle speed, the adjacent vehicle data, a safe following distance, and the adjacent lane data, generate merger information for a potential merge for the vehicle, wherein the merger information comprises at least a safety rating of the potential merge, wherein the safety rating of the potential merge is based in part on a minimum acceleration of the vehicle and a maximum amount of time to reach the vehicle speed of one or more vehicles within the adjacent lane and merge, wherein the potential merge comprises the vehicle entering the adjacent lane and accelerating to the vehicle speed of one or more vehicles within the adjacent lane while remaining at least the safe following distance ahead of the adjacent vehicle, wherein the safety rating is further based at least on a vehicle type of the vehicle, and wherein the safe following distance is based on a predetermined travel-time gap that is based on (i) the vehicle type including a length of the vehicle, and (ii) a road condition, and wherein the maximum amount of time to reach the vehicle speed of one or more vehicles within the adjacent lane is determined based on a formula of twice a distance between the vehicle and the adjacent vehicle divided by the vehicle speed subtracted from the vehicle speed of one or more vehicles within the adjacent lane.

18. The computer program product of claim 17, wherein the merger information comprises at least one of a target merge speed or a merging acceleration based on the adjacent vehicle data, the adjacent lane data, and the vehicle speed.

19. The computer program product of claim 17, wherein the program code instructions are further configured to update a driving lane of the vehicle based on the merger information.

20. The computer program product of claim 19, wherein the program code instructions are further configured to alter the minimum acceleration of the vehicle based on the merger information.

* * * * *